United States Patent
Heit et al.

(10) Patent No.: US 8,265,589 B2
(45) Date of Patent: Sep. 11, 2012

(54) METHOD AND SYSTEM FOR THE COLLECTION OF VOICE CALL STATISTICS FOR A MOBILE DEVICE

(75) Inventors: David L. Heit, Waterloo (CA); Atul Asthana, Unionville (CA); Douglas Michael Gisby, Atlanta, GA (US)

(73) Assignee: Research In Motion Limited, Waterloo (CA)

( * ) Notice: Subject to any disclaimer, the term of this patent is extended or adjusted under 35 U.S.C. 154(b) by 1045 days.

(21) Appl. No.: 11/876,168

(22) Filed: Oct. 22, 2007

(65) Prior Publication Data

US 2008/0214143 A1 Sep. 4, 2008

Related U.S. Application Data

(60) Provisional application No. 60/862,329, filed on Oct. 20, 2006.

(51) Int. Cl.
*H04M 11/00* (2006.01)

(52) U.S. Cl. ..... 455/405; 455/406; 455/461; 455/414.1; 455/432.3; 379/355.02

(58) Field of Classification Search ............... 455/426.2, 455/67.1, 423, 426, 435.1, 436, 406, 405, 455/412.1, 414.1, 432.3, 456.6, 461, 67.11; 379/355.02
See application file for complete search history.

(56) References Cited

U.S. PATENT DOCUMENTS

| | | | |
|---|---|---|---|
| 6,377,567 B1 * | 4/2002 | Leonard | 370/352 |
| 6,642,942 B1 * | 11/2003 | Crook | 715/744 |
| 7,003,298 B1 | 2/2006 | Jagadeesan | |
| 8,165,109 B2 * | 4/2012 | King et al. | 370/352 |
| 2002/0072358 A1 * | 6/2002 | Schneider et al. | 455/423 |
| 2002/0076030 A1 * | 6/2002 | Statham et al. | 379/229 |
| 2002/0155816 A1 | 10/2002 | Fodor et al. | |
| 2002/0173292 A1 * | 11/2002 | Boatwright | 455/410 |
| 2003/0055985 A1 | 3/2003 | Corb et al. | |
| 2003/0088579 A1 * | 5/2003 | Brown et al. | 707/104.1 |
| 2004/0266426 A1 | 12/2004 | Marsh et al. | |
| 2005/0032527 A1 * | 2/2005 | Sheha et al. | 455/456.1 |
| 2005/0180404 A1 * | 8/2005 | Kwon | 370/352 |

(Continued)

FOREIGN PATENT DOCUMENTS

WO WO0249375 6/2002

(Continued)

OTHER PUBLICATIONS

EP 07816000.9, European Extended Search Report dated Jan. 10, 2009.

*Primary Examiner* — Erika Gary
*Assistant Examiner* — Mong-Thuy Tran
(74) *Attorney, Agent, or Firm* — Novak Druce + Quigg LLP (57) ABSTRACT

A method and system for collecting and tracking statistics of a mobile device having the steps of: adding a call statistics server at an enterprise, the call statistics server adapted to receive call statistics information from one or more mobile devices or adapted to gather call statistics information directly through monitoring call setup, throughput and disconnection traffic; and providing call statistics information to a recipient. The mobile device can then obtain and display the call statistics.

9 Claims, 5 Drawing Sheets

U.S. PATENT DOCUMENTS

| | | | |
|---|---|---|---|
| 2006/0036813 A1* | 2/2006 | Henocq et al. | 711/141 |
| 2006/0128359 A1* | 6/2006 | Jung | 455/406 |
| 2006/0135197 A1* | 6/2006 | Jin et al. | 455/550.1 |
| 2006/0136504 A1* | 6/2006 | Babutzka et al. | 707/201 |
| 2006/0217116 A1* | 9/2006 | Cassett et al. | 455/423 |
| 2007/0123224 A1* | 5/2007 | Nishiyama et al. | 455/414.1 |
| 2007/0201681 A1* | 8/2007 | Chen et al. | 379/355.02 |
| 2007/0293207 A1* | 12/2007 | Guedalia et al. | 455/415 |
| 2008/0021762 A1* | 1/2008 | Coon et al. | 705/10 |

FOREIGN PATENT DOCUMENTS

WO   WO2006040673   4/2006

* cited by examiner

METHOD AND SYSTEM FOR THE COLLECTION OF VOICE CALL STATISTICS FOR A MOBILE DEVICE

CROSS-REFERENCE TO RELATED APPLICATIONS

The instant application claims priority from U.S. Provisional Patent Application Ser. No. 60/862,329 filed Oct. 20, 2006, the disclosures of which are incorporated herein by reference.

FIELD OF THE DISCLOSURE

The present application relates to call statistics collection, and in particular, to the collection of call statistics information for a mobile device capable of transmitting voice and data.

BACKGROUND

Mobile devices capable of transmitting voice and data are becoming increasingly common in the marketplace and are referred to as Smartphones, personal digital systems or other similar names. Examples include the Research in Motion Blackberry™, Palm Treo™, among others.

The capability of transmitting voice over a data connection is what is called "Voice Over Internet Protocol" (VoIP) and allows such devices to carry voice traffic over an Internet connection, bypassing the traditional circuit switched voice service offered over a wide area wireless networks.

Mobile devices are also becoming multi-mode, meaning that they can use multiple radio technologies such as Global System for Mobile communication (GSM), Code Division Multiple Access (CDMA), third generation (3G) and wireless fidelity (WiFi), among others, to transmit voice calls and data traffic. Using the data capability available on Smartphones, the user may wish to view historical data associated with calls made from his/her handset.

The collection of historical data or statistics for voice calls is essential to any telecommunications provider, as it is the basis for billing. But is also a tool that can be used for network configuration and planning as well as troubleshooting specific problems with specific handset makes or specific users. This information, if available to the user, could also aid the user in better understanding how to use their mobile device in a more cost effective way, as well as providing information on how they have used the mobile device in the past.

BRIEF DESCRIPTION OF THE DRAWINGS

The present disclosure will be better understood with reference to the drawings in which.

DETAILED DESCRIPTION

The advent of data capable mobile device allows an enterprise to provide a server to collect statistics that are reported to it from mobile devices using data connectivity available. These statistics can be viewed by corporate telecom management. The information allows a corporate information technology (IT) group to configure its network through a corporate IT policy, planning for future growth and troubleshooting voice calls.

With the mix of radio technologies available and used, corporate IT management needs information on network service interplay, such as hand-off between network services using different technologies. The collection of statistics in this new environment therefore becomes an important tool to help the users and owners of multi-mode mobile devices to manage and control usage and costs.

The present disclosure provides a method for collecting and tracking statistics of a mobile device comprising the steps of: adding a statistics server at an enterprise, said statistics server adapted to receive call statistics information from one or more mobile devices or adapted to gather call statistics information directly through monitoring call set-up, throughput and disconnection traffic; and, providing call statistics information to a recipient.

The present disclosure further provides a method on a mobile device for maintaining a call statistics information repository comprising the steps of: after a call has ended, requesting statistics from a call statistics server, receiving the statistics from the call statistics server, and updating the repository with the received statistics.

The present disclosure further provides a mobile device adapted to show call history, comprising a communications subsystem adapted to communicate with one or more networks and further adapted to communicate with a call statistics server; a repository, the repository adapted to store call statistics received from the call statistics server; and a user interface, said user interface comprising a display for selectively showing call history on the mobile device.

The present disclosure further provides a call statistics server located within an enterprise, the call statistics server comprising: a processor adapted to monitor call setup, throughput and disconnection traffic of one or more mobile devices and/or to receive call statistics from the one or more mobile devices; and storage, said storage adapted to store statistics found or received by the processor, wherein said call statistics server is adapted to provide stored statistics to a recipient.

The present disclosure further provides a system for collecting and providing call statistics information to a mobile device comprising: a call statistics server, said call statistics server having: a processor adapted to monitor call setup, throughput and disconnection traffic of one or more mobile devices or to receive call statistics from the one or more mobile devices; and storage, said storage adapted to store statistics found or received by the processor; and one or more mobile devices, each of said one or more mobile devices having: a communications subsystem adapted to communicate with one or more networks and further adapted to communicate with the call statistics server; a repository, the repository adapted to store call statistics received from the call statistics server; and a user interface, said user interface comprising a display for selectively showing call history on the mobile device.

Figure 1:
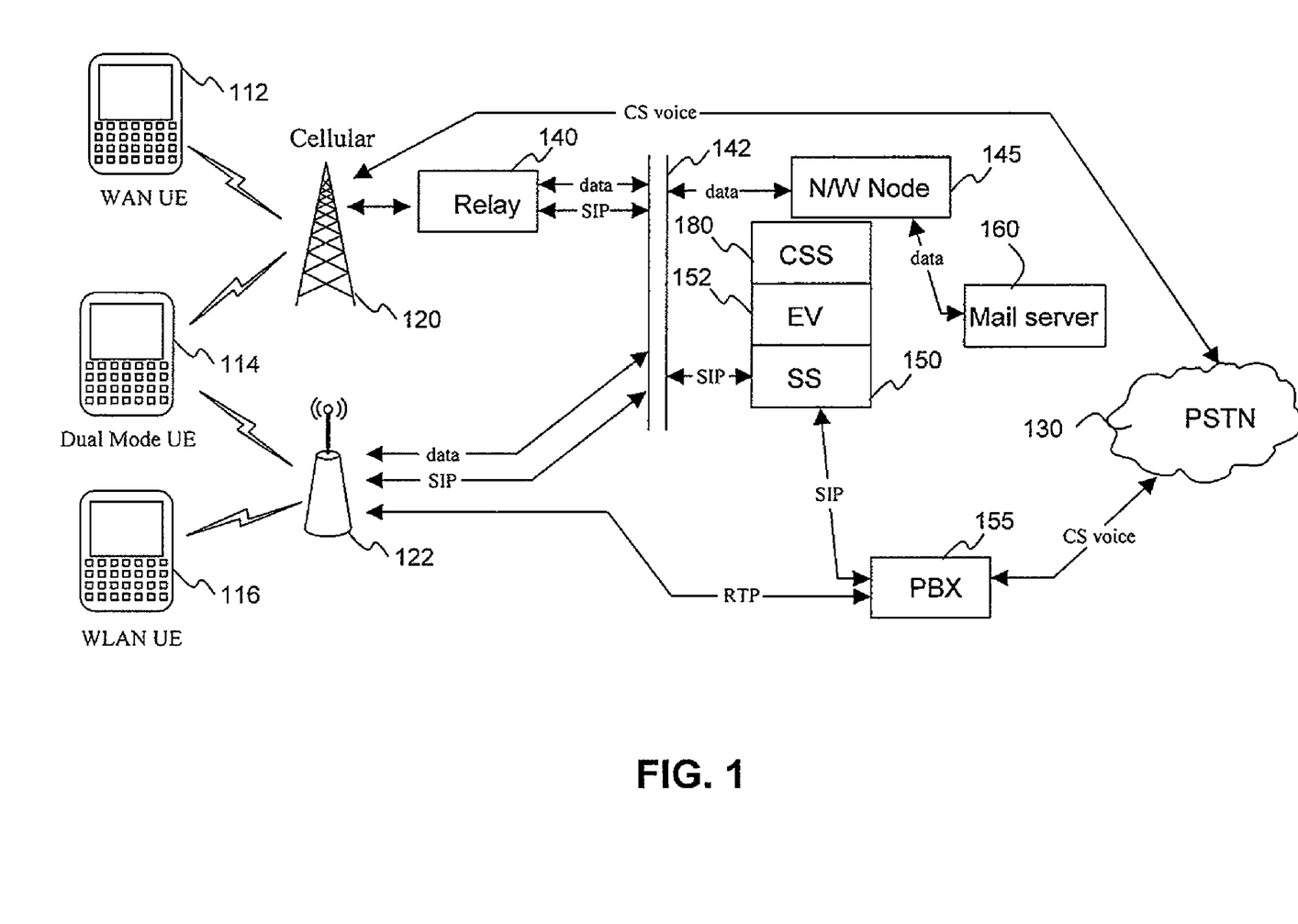
FIG. 1 is a block diagram showing an architecture of an exemplary mobile device network.

Reference is now made to FIG. 1. FIG. 1 illustrates an architectural overview for voice and data. Three mobile devices, 112, 114 and 116 are illustrated.

Mobile device 112 is a single mode wide area network mobile device (WAN) which communicates with a cellular network 120.

Mobile device 116 is a single mode wireless local area network (WLAN) mobile device which communicates with the data access point 122.

Mobile device 114 is a dual mode mobile device which communicates both with the cellular network 120 and the data access point 122.

The present disclosure will use mobile device 114, which is a dual mode mobile device, for illustration purposes.

Mobile device 114 may connect through cellular network 120 to provide either voice or data services. As will be appreciated, various cellular networks exist including, but not limited to, GSM, General Packet Radio Service (GPRS), CDMA, Universal Mobile Telecommunications System (UMTS), Wideband Code Division Multiple Access (WCDMA), among others. These technologies allow the use of voice, data or both at one time.

A circuit switched call, as seen from FIG. 1, will proceed through a circuit switched voice channel to public switched telephone network 130.

Data proceeds through a relay 140, preferably through a firewall 142 to one of several servers servicing the data call.

As is seen in FIG. 1, data proceeds through the firewall 142 to a network node 145 and potentially out to a Mail Server 160, depending on the nature of the data.

If the call is a transmission of voice over a data connection using VoIP, the data proceeds over session initiation protocol (SIP) to a SIP server 150.

From SIP server 150, the VoIP call proceeds over a private branch exchange (PBX) 155 and then becomes a circuit-switched voice call over Public Switched Telephone Network (PSTN) 130.

Mobile device 114 can further communicate over a data access point for a wireless local area network (WLAN). Examples of WLAN technologies include Wireless Fidelity (WiFi) or Worldwide Interoperability for Microwave Access (WiMax) as underlying technologies of wireless local area networks.

As with the cellular connection, data and VoIP calls can be routed through a firewall 142 to either the network node 145 or to SIP server 150. The VoIP call then would proceed again through PBX 155 to PSTN 130.

Alternatively, the VoIP call can be routed through a real time transport protocol (RTP) directly to the private branch exchange 155, at which point it is converted to a circuit switched call and routed through the public switched telephone network (PSTN) 130.

An Enterprise Voice Server 152 could be included for various functionality including monitoring voice calls, providing call statistics, call costs, policy usage, among others.

For a handheld mobile device user, access to call statistics can be very helpful to know, for example, how many calls were made to a specific number or person in the last month, and how many minutes did these calls last. This can be used to verify charges for certain types of calls that are billable, such as calls to a solicitor. Other information, such as calls made over a specific network, provider or technology; calls from a specific geographic location; calls that were handed over across network services; calls unanswered; missed incoming calls; and calls made while outside the home network (roaming) are a few examples.

Also, call history could be integrated with a customer relationship management system where the handheld user can request further information about a specific call. For example, if a salesman takes notes about a conversation, those notes could be reviewed before a follow-up call is made. Call tracking can be very complicated for sales personnel, and such a tool would greatly assist them in managing their time.

Presenting call history information in a user friendly format on a mobile device display can be an invaluable tool for mobile workers.

In a further embodiment, a corporate IT group can also access all of the above listed information and may generate statistic reports for a group of users or makes of handsets and also specific voice call patterns. If a number of users complain of dropped calls on a specific network provider in a specific location, the voice call statistics could provide evidence of that behavior, which can then be reported back to the carrier in question. Significant numbers of examples exist where call statistics access will be helpful in managing corporate IT voice call costs.

Referring again to FIG. 1, a call statistics server 180 is located within an enterprise. As will be appreciated by those skilled in the art, call statistics server 180 may be part of a network node 145 or can be a separate server communicating with the network node 145.

Call statistics server 180 can receive call statistic information from handheld mobile devices or gather these statistics directly through the monitoring of voice call set-up, throughput and disconnection traffic, and hold this information for use by corporate IT and handheld users.

Figure 4:
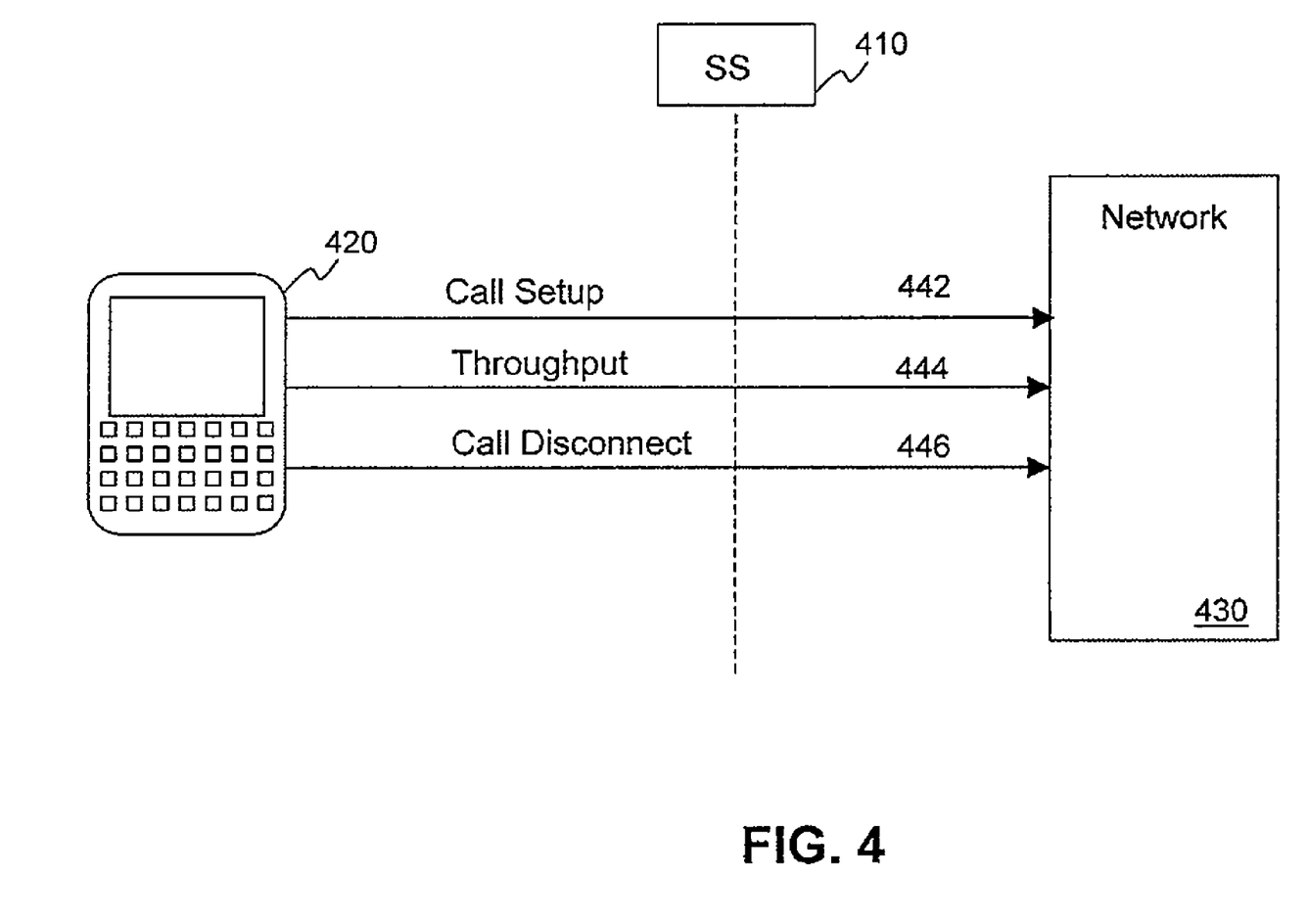
FIG. 4 is a data flow diagram illustrating a call statistics server monitoring communications between a mobile device and a network.

Reference is now made to FIG. 4. FIG. 4 shows a data flow diagram in which a call statistics server 410 monitors communications between a mobile device 420 and a network 430. As will be appreciated by those skilled in the art network 430 could be any network that a mobile device communicates with, and reference is made, for example, to FIG. 1 to show exemplary networks.

Mobile device 420 sends various messages to network 430. These include a call set up message 442, data and/or voice throughput message 444 and call disconnection message 446, among others. In the embodiment of FIG. 4 call statistics server 410 monitors messages 442, 444 and 446 to compile call statistics for mobile device 420. These statistics can then be stored on call statistics server 410 and provided to a mobile device 420 or to a corporate information technology department as required.

Figure 5:
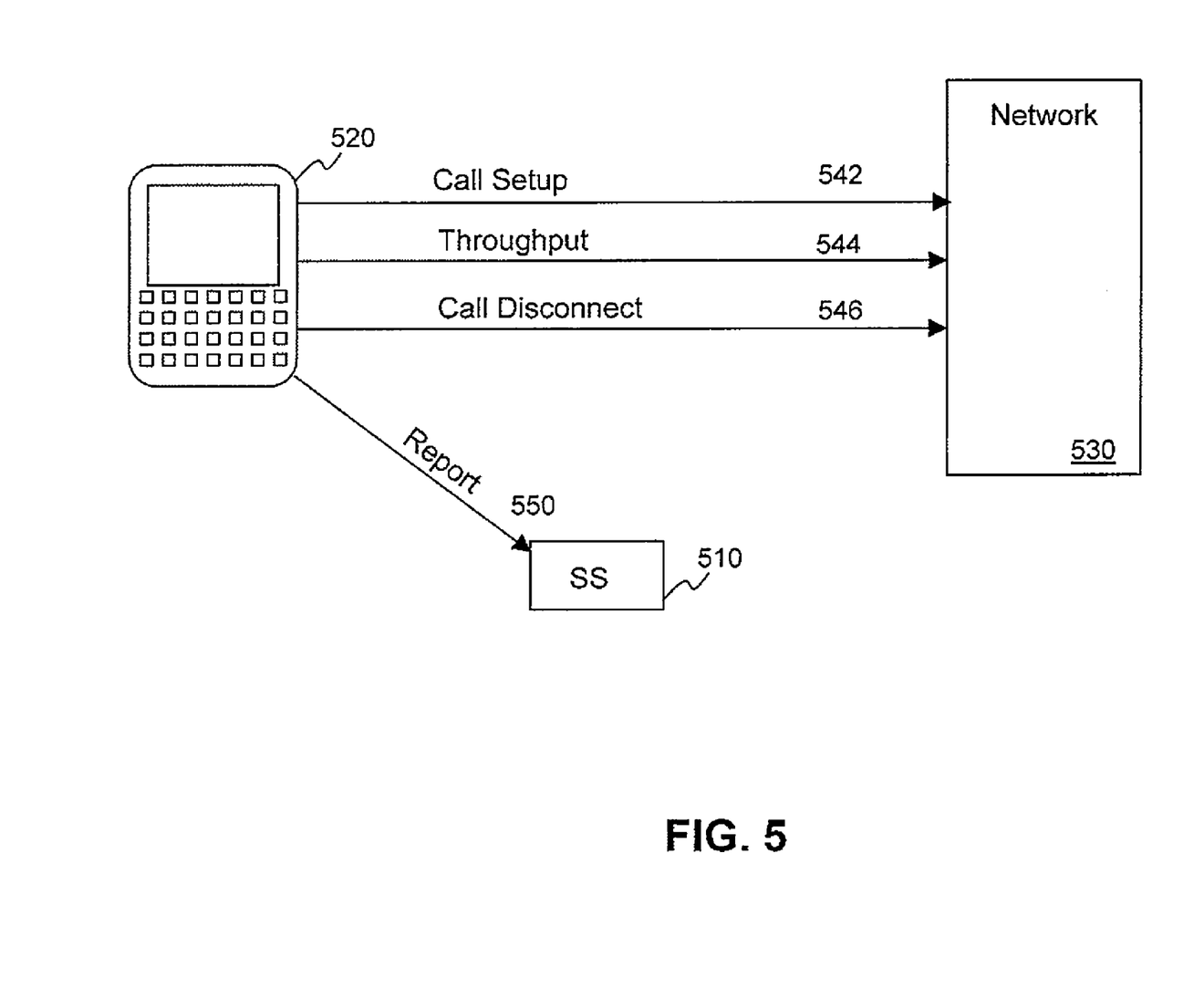
FIG. 5 is a data flow diagram illustrating a call statistics server receiving statistics reports from a mobile device.

Alternatively, a call statistic server could receive the statistics directly from a mobile device. Reference is now made to FIG. 5.

In the embodiment of FIG. 5 a call statistics server 510 collects statistics from a mobile device 520. Mobile device 520 communicates with a network 530. Message traffic between mobile device 520 and network 530 could include, for example, a call set up message 542, data and/or voice throughput 544 and call disconnection message 546.

In the embodiment of FIG. 5, once a mobile device 520 sends a call disconnection message 546, or the call is disconnected for any other reason, a reporting message 550 is sent to a call statistics server 510. Such a reporting message 550 could include the duration of the call, data throughput, network used, networks the call was transferred to and the time of the transfer, and destination phone number, among others. Call statistics server can then compile call statistics for mobile device 520 based on the received reporting messages 550.

Alternatively, a reporting message 550 could be sent after each of the stages illustrated by messages 542, 544 and 546. In particular, a reporting message could be sent after the call setup, periodic reporting messages could be sent to indicate call throughput and a message could be sent at call disconnection. In this case, call statistics server 510 would compile the various reporting messages to produce call statistics for mobile device 520.

Figure 2:
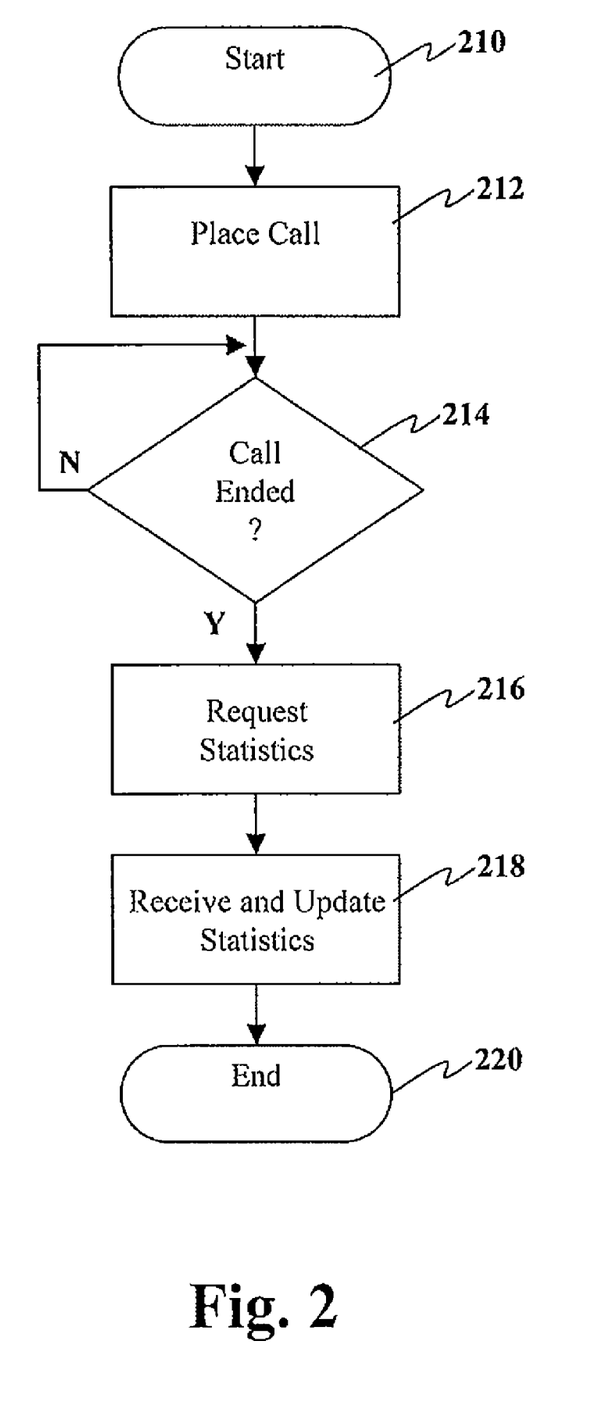
FIG. 2 is a flow chart for a method of a mobile device to collect call statistics.

Once call statistics are compiled, they are in many cases useful to the user of a mobile device. Reference is now made to FIG. 2. FIG. 2 shows a flow chart illustrating a method for a mobile device to obtain call statistics. As will be appreciated by those skilled in the art, FIG. 2 is merely one method of obtaining call statistics and other methods are possible. In particular, call statistics can either be stored on the mobile device or, if a user is accessing call statistics information, it can be obtained from the network at that time.

If the call statistics are being kept on the mobile device, the call statistics can be updated periodically, for example, once a day, once an hour or after each call has been made. FIG. 2 shows the last option, but is not meant to limit the present disclosure.

Referring to FIG. 2, the process starts at step 210. The process then proceeds to step 212 in which the mobile device places a call. Step 214 monitors whether the call has ended.

Once the call has ended, the process proceeds to step 216 in which the statistics are requested from the statistics server (for example, call statistics server 180 from FIG. 1).

The process proceeds to step 218 in which it receives the statistics from the statistic server 180 and updates the storage of the statistics on the mobile device. As will be appreciated, step 218 allows the updating of locally stored call statistics by the mobile device by only receiving call statistics for the call that has just ended. This allows the mobile device to maintain an up-to-date database and limits the amount of data that needs to be sent over the air each time a statistics storage on the mobile device is updated.

Once the mobile device has call statistics, a user interface to display the cost statistics can be presented. This interface aids the user in better understanding how to use their handheld device in a more cost effective way. The user interface on a mobile device can, in one embodiment, exploit a high quality display to show call history. The call history may be viewed from a number of historical perspectives such as:

number of calls made from mobile device, duration, time, and date and cost of each call;
 total number of minutes, total costs;
 calls made to a specific number showing time, date, duration and cost;
 all of the above showing calls made using a specific network service;
 all of the above showing calls handed over across network services.

In one embodiment, dual mode devices such as mobile device 114 from FIG. 1 provide the option of showing the number of minutes of voice over a WiFi versus a circuit switched call. Further information can be provided about calls dropped from WiFi and reconnected on circuit switched networks; statistics on circuit switched call set-ups that are rerouted to WiFi; statistics on ongoing circuit switched calls automatically switched to WiFi.

The present statistics also can show calls that are rerouted to 800 service numbers as opposed to direct dial numbers.

As will be appreciated by those skilled in the art, the above therefore allows for the collection of statistics for different types of access technologies and can consolidate call history. Thus, whether the mobile uses VoIP over a WiFi network or a circuit switched call through a cellular network, the statistics can be corrected and consolidated. Further, by maintaining a separate dedicated server at the enterprise, both the user can benefit by being provided with up-to-date information in a high quality user interface and the enterprise information technology department can better make policy for the use of the handheld device.

As will be appreciated, the above can be implemented on any mobile device. One exemplary mobile device is described below with reference to FIG. 3. This is not meant to be limiting, but is provided for illustrative purposes.

Figure 3:
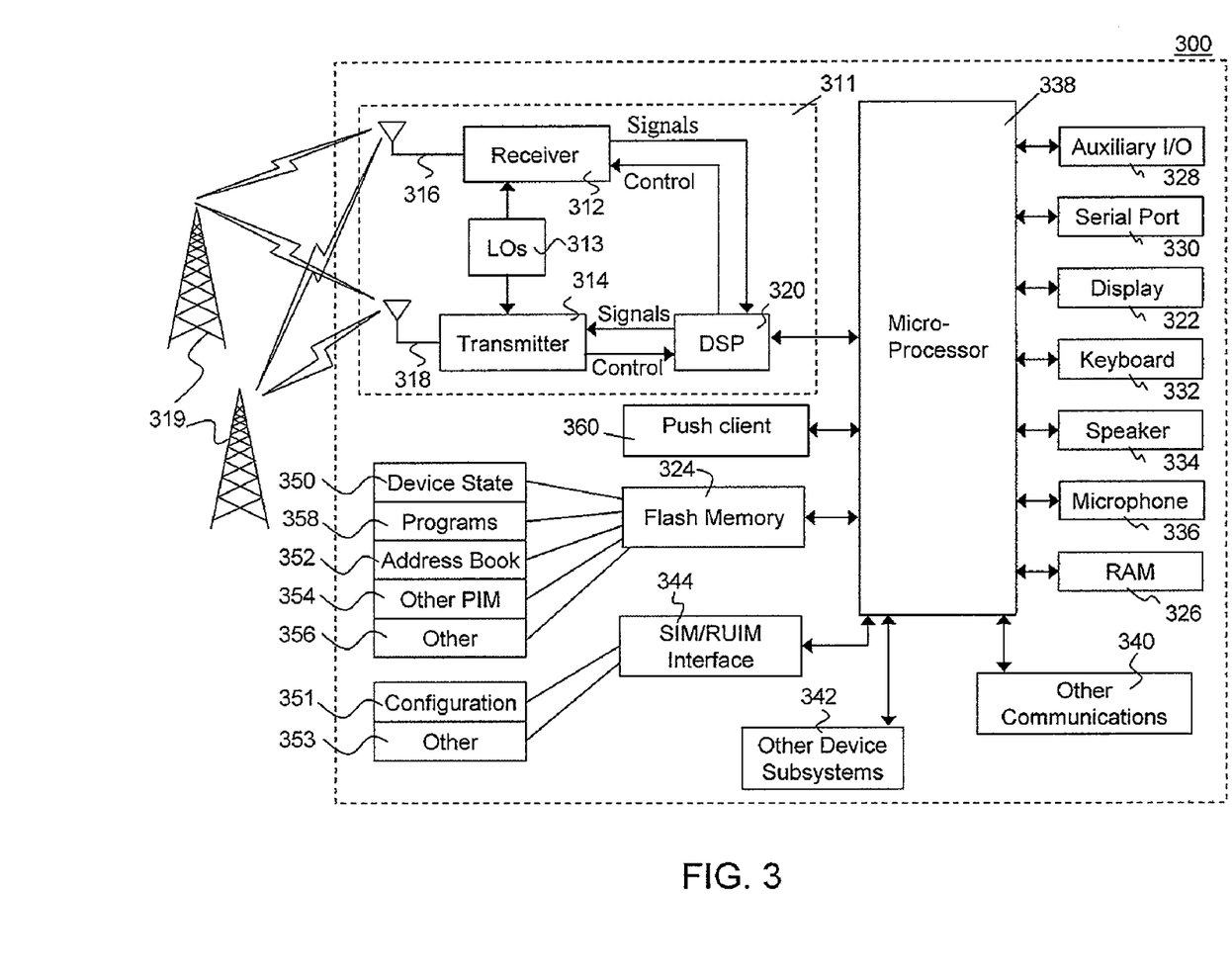
FIG. 3 is a block diagram of an exemplary mobile device for use in association with the present method and system.

FIG. 3 is a block diagram illustrating a mobile device apt to be used with preferred embodiments of the apparatus and method of the present application. Mobile device 300 is preferably a two-way wireless communication device having at least voice and data communication capabilities. Mobile device 300 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 300 is enabled for two-way communication, it will incorporate a communication subsystem 311, including both a receiver 312 and a transmitter 314, as well as associated components such as one or more, preferably embedded or internal, antenna elements 316 and 318, local oscillators (LOs) 313, and a processing module such as a digital signal processor (DSP) 320. As will be apparent to those skilled in the field of communications, the particular design of the communication subsystem 311 will be dependent upon the communication network in which the device is intended to operate.

Network access requirements will also vary depending upon the type of network 319. In some CDMA networks network access is associated with a subscriber or user of mobile device 300. A CDMA mobile device may require a removable user identity module (RUIM) or a subscriber identity module (SIM) card in order to operate on a CDMA network. The SIM/RUIM interface 344 is normally similar to a card-slot into which a SIM/RUIM card can be inserted and ejected like a diskette or PCMCIA card. The SIM/RUIM card can have approximately 64K of memory and hold many key configuration 351, and other information 353 such as identification, and subscriber related information.

When required network registration or activation procedures have been completed, mobile device 300 may send and receive communication signals over the network 319. As illustrated in FIG. 3, network 319 can consist of multiple base stations communicating with the mobile device. For example, in a hybrid CDMA 1×EVDO system, a CDMA base station and an EVDO base station communicate with the mobile device and the mobile device is connected to both simultaneously. The EVDO and CDMA 1× base stations use different paging slots to communicate with the mobile device.

Signals received by antenna 316 through communication network 319 are input to receiver 312, which may perform such common receiver functions as signal amplification, frequency down conversion, filtering, channel selection and the like, and in the example system shown in FIG. 3, analog to digital (A/D) conversion. A/D conversion of a received signal allows more complex communication functions such as demodulation and decoding to be performed in the DSP 320. In a similar manner, signals to be transmitted are processed, including modulation and encoding for example, by DSP 320 and input to transmitter 314 for digital to analog conversion, frequency up conversion, filtering, amplification and transmission over the communication network 319 via antenna 318. DSP 320 not only processes communication signals, but also provides for receiver and transmitter control. For example, the gains applied to communication signals in receiver 312 and transmitter 314 may be adaptively controlled through automatic gain control algorithms implemented in DSP 320.

Mobile device 300 preferably includes a microprocessor 338 which controls the overall operation of the device. Communication functions, including at least data and voice communications, are performed through communication subsystem 311. Microprocessor 338 also interacts with further device subsystems such as the display 322, flash memory 324, random access memory (RAM) 326, auxiliary input/output (I/O) subsystems 328, serial port 330, one or more keyboards or keypads 332, speaker 334, microphone 336, other communication subsystem 340 such as a short-range communications subsystem and any other device subsystems generally designated as 342. Serial port 330 could include a USB port or other port known to those in the art.

Some of the subsystems shown in FIG. 3 perform communication-related functions, whereas other subsystems may provide "resident" or on-device functions. Notably, some subsystems, such as keyboard 332 and display 322, for example, may be used for both communication-related functions, such as entering a text message for transmission over a communication network, and device-resident functions such as a calculator or task list.

Operating system software used by the microprocessor 338 is preferably stored in a persistent store such as flash memory 324, which may instead be a read-only memory (ROM) or similar storage element (not shown). Those skilled in the art will appreciate that the operating system, specific device applications, or parts thereof, may be temporarily loaded into a volatile memory such as RAM 326. Received communication signals may also be stored in RAM 326.

As shown, flash memory 324 can be segregated into different areas for both computer programs 358 and program data storage 350, 352, 354 and 356. These different storage types indicate that each program can allocate a portion of flash memory 324 for their own data storage requirements. Microprocessor 338, in addition to its operating system functions, preferably enables execution of software applications on the mobile device. A predetermined set of applications that control basic operations, including at least data and voice communication applications for example, will normally be installed on mobile device 300 during manufacturing. Other applications could be installed subsequently or dynamically.

A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 319. In a preferred embodiment, the PIM data items are seamlessly integrated, synchronized and updated, via the wireless network 319, with the mobile device user's corresponding data items stored or associated with a host computer system. Further applications may also be loaded onto the mobile device 300 through the network 319, an auxiliary I/O subsystem 328, serial port 330, short-range communications subsystem 340 or any other suitable subsystem 342, and installed by a user in the RAM 326 or preferably a non-volatile store (not shown) for execution by the microprocessor 338. Such flexibility in application installation increases the functionality of the device and may provide enhanced on-device functions, communication-related functions, or both. For example, secure communication applications may enable electronic commerce functions and other such financial transactions to be performed using the mobile device 300.

In a data communication mode, a received signal such as a text message or web page download will be processed by the communication subsystem 311 and input to the microprocessor 338, which preferably further processes the received signal for element attributes for output to the display 322, or alternatively to an auxiliary I/O device 328. A push client 360 could also process the input.

A user of mobile device 300 may also compose data items such as email messages for example, using the keyboard 332, which is preferably a complete alphanumeric keyboard or telephone-type keypad, in conjunction with the display 322 and possibly an auxiliary I/O device 328. Such composed items may then be transmitted over a communication network through the communication subsystem 311.

For voice communications, overall operation of mobile device 300 is similar, except that received signals would preferably be output to a speaker 334 and signals for transmission would be generated by a microphone 336. Alternative voice or audio I/O subsystems, such as a voice message recording subsystem, may also be implemented on mobile device 300. Although voice or audio signal output is preferably accomplished primarily through the speaker 334, display 322 may also be used to provide an indication of the identity of a calling party, the duration of a voice call, or other voice call related information for example.

Serial port 330 in FIG. 3 would normally be implemented in a personal digital assistant (PDA)-type mobile device for which synchronization with a user's desktop computer (not shown) may be desirable, but is an optional device component. Such a port 330 would enable a user to set preferences through an external device or software application and would extend the capabilities of mobile device 300 by providing for information or software downloads to mobile device 300 other than through a wireless communication network. The alternate download path may for example be used to load an encryption key onto the device through a direct and thus reliable and trusted connection to thereby enable secure device communication. As will be appreciated by those skilled in the art, serial port 330 can further be used to connect the mobile device to a computer to act as a modem.

Other communications subsystems 340, such as a short-range communications subsystem, is a further optional component which may provide for communication between mobile device 300 and different systems or devices, which need not necessarily be similar devices. For example, the subsystem 340 may include an infrared device and associated circuits and components or a Bluetooth™ communication module to provide for communication with similarly enabled systems and devices. Subsystem 340 may also be used for WiFi communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A method on a multi-mode mobile device for collecting and tracking call statistics of said mobile device that is adapted to communicate voice and data, with one or more networks having multiple radio technologies, said method comprising the steps of:

reporting to a call statistics server one or more call reporting messages for each call for compilation at said call statistics server to produce call statistics, each of said call reporting messages including at least one of: duration of a call, data throughput, network used, networks the call was transferred to, time of the call transfer, and destination phone number;

requesting call statistics from said call statistics server, said call statistics including at least one of: number of calls made to specific phone number, duration of calls, calls made using a specific network service, calls handed over across network services, calls received from a specific geographic location, missed incoming calls, calls made outside a home network, and calls rerouted to 800 service numbers versus direct dial numbers; and updating a repository on said mobile device with said received call statistics, wherein the mobile device provides a display to show call history, said call history being based on said call statistics stored in said repository and includes at least one of: number of calls made from said mobile device; duration, time, date and cost of each call; total number of minutes and total costs of all calls made from said mobile device; calls made to a specific phone number; time, date, duration and cost for calls made to a specific phone number; calls made using a specific network service; calls handed over across network services; and statistic enabling at least a comparison between voice service over a packet-switched wireless local area network and voice service over a circuit-switched wide area wireless network.

2. The method of claim 1, wherein said requesting step comprises:

after a call has ended, requesting statistics from said call statistics server;

receiving the statistics from the call statistics server.

3. The method of claim 2, wherein the received statistics only relate to the call that has ended.

4. The method of claim 1, wherein the call statistics further comprises at least one of: a number of minutes of voice over wireless local area network 'WLAN' as compared with the number of minutes of voice over a circuit-switched network service; statistics for calls dropped from a WLAN and reconnected on a circuit switched network, information about circuit switched call set-ups that are re-routed to WLAN network services; and ongoing circuit switched calls that automatically switched to WLAN network services.

5. The method of claim 1, wherein the mobile device is adapted to communicate voice and data with networks of multiple radio technologies that include at least voice service over a packet-switched wireless local area network and voice service over a circuit-switched wide area wireless network.

6. A multi-mode mobile device capable of voice and data communication and adapted to show call history, comprising:

a communications subsystem adapted to communicate with one or more networks of multiple radio technologies, said communication subsystem further adapted to communicate call reporting messages to a call statistics server, each of said call reporting messages includes at least one of: duration of a call, data throughput, network used, networks the calls was transferred to, time of the call transfer, and designation phone number;

a repository, the repository adapted to store call statistics received from the call statistics server, said call statistics being compiled and produced by said call statistics server from said call reporting messages, said call statistics including at least one of: number of calls made to a specific phone number, duration of calls, calls made using a specific network service, calls handed over across network services, calls received from a specific geographic location, missed incoming calls, calls made outside a home network, and calls rerouted to 800 service numbers versus direct dial numbers; and a memory containing a program;

a processor arranged to execute said program for implementing the method of claim 1; and a user interface, said user interface comprising a display for selectively showing call history on the mobile device, wherein said call history is based on said stored call statistics.

7. A system for collecting and providing call statistics to a multi-mode mobile device that is adapted for voice and data communication with one or more networks of multiple radio technologies, said system comprising:

a) a call statistics server, said call statistics server having:

a processor adapted to receive call reporting messages from a multi-mode mobile device that is capable of voice and data communication with one or more networks of multiple radio technologies, and is further adapted to compile and produce call statistics from said received reporting messages, and to communicate call statistics to said mobile device, each of said call reporting messages includes at least one of: duration of a call, data throughput, network used, networks the call was transferred to, time of the call transfer, and destination phone number; and storage, said storage adapted to store said call statistics, said call statistics including at least one of: number of calls made to a specific phone number, duration of calls, calls made using a specific network service, calls handed over across network services, calls received from a specific geographic location, missed incoming calls, calls made outside a home network, calls rerouted to 800 service numbers versus direct dial numbers, number of minutes of voice calls over a packet-switched wireless local area network as compared with number of minutes of voice calls over a circuit-switched wide area wireless network, statistics for calls dropped from a packet-switched wireless local area network and reconnected on a circuit-switched wide area wireless network, statistics on circuit-switched call set-ups that are re-routed to a packet-switched wireless local area network, and statistics on ongoing circuit-switched calls that are automatically switched to a packet-switched wireless local area networks; and b) the mobile device having:

a communications subsystem adapted to communicate with one or more networks of multiple radio technologies and further adapted to communicate call reporting messages to the call statistics server, each of said call reporting messages including at least one of: duration of a call, data throughput, network used, networks the call was transferred to, time of the call transfer, and destination phone number;

a repository, the repository adapted to store call statistics received from the call statistics server, said call statistics being compiled and produced by said call statistics server from said call reporting messages, said call statistics including at least one of: number of calls made to a specific phone number, duration of calls, calls made using a specific network service, calls handed over across network services, calls received from a specific geographic location, missed incoming calls, calls made outside a home network, and calls rerouted to 800 service numbers versus direct dial numbers; and a user interface, said user interface comprising a display for selectively showing call history on the mobile device, wherein said call history is based on said stored call statistics;

a memory containing a program;

a processor arranged to execute said program for implementing the method of claim 1.

8. A method on a call statistics server for producing call statistics for a multi-mode mobile device that is adapted to communicate voice and data with one or more networks of multiple radio technologies, said method comprising the steps of:

receiving from said mobile device one or more call reporting messages for each call, each of said call reporting messages includes at least one of: duration of a call, data throughput, network used, networks the call was transferred to, time of the call transfer, and destination phone number;

compiling said call reporting messages to produce call statistics, said call statistics includes at least one of: number of calls made to a specific phone number, duration of calls, calls made using a specific network service, calls handed over across network services, calls received from a specific geographic location, missed incoming calls, calls made outside a home network, and calls rerouted to 800 service numbers versus direct dial numbers; and storing said call statistics in a storage on said call statistics server, wherein said call statistics further comprises at least one of: number of minutes of voice calls over a packet-switched wireless local area network as compared with a number of minutes of voice calls over a circuit-switched wide area wireless network, statistics for calls dropped from a packet-switched wireless local area network and reconnected on a circuit-switched wide area wireless network, statistics on circuit-switched call set-ups that are re-routed to a packet-switched wireless local area network, and statistics on ongoing circuit-switched calls that are automatically switched to a packet-switched wireless local area network.

9. The method of claim 8, wherein said call statistics server sends call statistics to said mobile device when requested by said mobile device.

\* \* \* \* \*